United States Patent
Bajracharya

(10) Patent No.: US 9,404,607 B2
(45) Date of Patent: Aug. 2, 2016

(54) AFTERCOOLER PIPE SUPPORT ASSEMBLY

(71) Applicant: Caterpillar Global Mining Equipment LLC, South Milwaukee, WI (US)

(72) Inventor: Bijay Bajracharya, Greenfield, WI (US)

(73) Assignee: Caterpillar Global Mining LLC, South Milwaukee, WI (US)

( * ) Notice: Subject to any disclaimer, the term of this patent is extended or adjusted under 35 U.S.C. 154(b) by 194 days.

(21) Appl. No.: 14/245,579

(22) Filed: Apr. 4, 2014

(65) Prior Publication Data
US 2015/0285405 A1 Oct. 8, 2015

(51) Int. Cl.
*F16L 3/20* (2006.01)
*F16L 3/08* (2006.01)
*B60R 16/08* (2006.01)
*F16L 3/10* (2006.01)
*F16L 3/12* (2006.01)
*F16L 3/133* (2006.01)

(52) U.S. Cl.
CPC . *F16L 3/20* (2013.01); *B60R 16/08* (2013.01); *F16L 3/08* (2013.01); *F16L 3/1016* (2013.01); *F16L 3/12* (2013.01); *F16L 3/133* (2013.01)

(58) Field of Classification Search
CPC ................. F16L 3/00; F16L 3/08; F16L 3/10; F16L 3/16; F16L 3/20
USPC ........ 123/195 A, 563; 248/49, 53, 58, 59, 62, 248/63, 65, 70, 734, 73
See application file for complete search history.

(56) References Cited

U.S. PATENT DOCUMENTS

| | | | | |
|---|---|---|---|---|
| 2,160,808 A | * | 6/1939 | Bradley | F16L 3/14 180/311 |
| 2,439,067 A | * | 4/1948 | Wood | F01N 13/1822 248/58 |
| 3,102,706 A | * | 9/1963 | Goldsmith | F16L 3/2053 248/542 |
| 4,116,411 A | * | 9/1978 | Masuda | F16L 3/16 180/89.2 |
| 4,301,989 A | * | 11/1981 | Kallenbach | F16L 55/005 248/548 |
| 4,516,750 A | | 5/1985 | Brunner | |
| 4,562,800 A | | 1/1986 | Tsujibayashi | |
| 4,638,965 A | * | 1/1987 | De Bruine | F01N 13/1822 180/89.2 |
| 5,825,536 A | | 10/1998 | Yasunaga et al. | |
| 5,934,423 A | | 8/1999 | Kallenbach | |
| 2005/0109886 A1 | | 5/2005 | Zearbaugh | |
| 2008/0042430 A1 | * | 2/2008 | Ichikawa | F02M 35/10144 285/61 |
| 2012/0090711 A1 | * | 4/2012 | Achez | F01P 3/205 137/798 |
| 2012/0256463 A1 | | 10/2012 | Whelan et al. | |

* cited by examiner

Primary Examiner — Grant Moubry

(57) ABSTRACT

A support assembly for a pipe arrangement includes a bracket, a clamp configured to couple to the pipe arrangement, and linkage assemblies coupled to the bracket and the clamp. The linkage assemblies include a rod, a first connector coupled to the rod at a first end and coupled to the bracket by a first locking assembly at a second end, and a second connector coupled to the rod at a first end and coupled to the clamp by a second locking assembly at a second end. The first connector is configured to rotate relative to the bracket about the first locking assembly and the second connector is configured to rotate relative to the clamp about the second locking assembly to allow movement of the clamp relative to the bracket in a first plane. A tightening assembly is adjustable to move the clamp relative to the bracket in a second plane.

9 Claims, 3 Drawing Sheets

# AFTERCOOLER PIPE SUPPORT ASSEMBLY

TECHNICAL FIELD

This disclosure relates to support assemblies for maintaining alignment of connecting air tubes, and particularly to an adjustable support assembly for maintaining alignment of engine turbo outlets to an aftercooler.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Large industrial machines may include hose or tube arrangements (e.g., bellows) that are used to transport fluids between one or more components of the machine. Tubes of the arrangement are often attached to a static component of the machine in order to support the tube in a desired position and maintain alignment with another component of the machine. For instance, an aftercooler assembly for an engine may include one or more tubes or hoses that require additional support. The assembly may be secured to a platform or another static component of the machine in order to substantially prevent movement and maintain a desired alignment of the tubes and/or hoses to one or more ports (e.g., engine ports). However, typical attachment mechanisms (e.g., a mounting bracket and hose clamp) may be rigid, which can make it difficult to assemble and install the fluid tubes while maintaining alignment with the necessary components. In addition, a rigid attachment mechanism may be subjected to a significant amount of stress in preventing movement of the fluid tubes, which can cause damage to and lead to failure of the attachment mechanism and/or the associated fluid tubes.

Some engines may include a mounting mechanism for a pipe arrangement that is movable to some extent relative to another engine component. An example of such a mounting mechanism can be found in U.S. Pat. No. 4,562,800, issued Jan. 7, 1986, for "Engine Intake Pipe Arrangement for Automotive Vehicle," which discloses wherein "fastening bands are arranged adjacent the respective mounting rings in a manner to partly encircle the intake pipe." Further disclosed is wherein "the bridging portions of the mounting rings and the fastening bands enable the intake pipe to be supported on the intake manifold in a so-called floating manner." However, movement of the intake pipe is subject to the resilience of the fastening bands, rather than being controllable. Also, the intake pipe is only movable in a single direction or plane.

SUMMARY

An embodiment of the present disclosure relates to a support assembly for a pipe arrangement. The support assembly includes a bracket configured to couple to a fixed component, a clamp configured to couple to the pipe arrangement, the clamp being sized to fit at least partially around the outer circumference of a pipe of the pipe arrangement, and two or more linkage assemblies coupled to the bracket and the clamp. Each of the linkage assemblies includes a rod configured to receive at least one of a compressive and a tensile force via the pipe arrangement, a first connector coupled to the rod at a first end and coupled to the bracket by a first locking assembly at a second end, and a second connector coupled to the rod at a first end and coupled to the clamp by a second locking assembly at a second end. The first connector is configured to rotate relative to the bracket about the first locking assembly and the second connector is configured to rotate relative to the clamp about the second locking assembly to allow movement of the clamp relative to the bracket in a first plane of motion. Each linkage assembly also includes a tightening assembly coupled to the rod and to at least one of the connectors, the tightening assembly being adjustable to move the clamp relative to the bracket in a second plane of motion by shortening or lengthening the linkage assembly.

Another embodiment of the present disclosure relates to a support system for a fluid pipe of an industrial vehicle. The system includes a first support assembly configured to couple a first portion of the fluid pipe to a fixed component of the vehicle. The first support assembly includes a first bracket configured to couple to the fixed component, a first clamp configured to couple to the first portion of the fluid pipe, and two or more first linkage assemblies coupled to the first bracket on a first end and to the first clamp on a second end, wherein the two or more first linkage assemblies are adjustable to allow movement of the first clamp relative to the first bracket in more than one plane, and wherein the two or more first linkage assemblies are configured to remain approximately parallel to each other when coupled to the first bracket and the first clamp. The system also includes a second support assembly configured to couple a second portion of the fluid pipe to the fixed component. The second support assembly includes a second bracket configured to couple to the fixed component, a second clamp configured to couple to the second portion of the fluid pipe, and two or more second linkage assemblies coupled to the second bracket on a first end and to the second clamp on a second end. The two or more second linkage assemblies are adjustable to allow movement of the second clamp relative to the second bracket in more than one plane, and, when coupled to the second bracket and the second clamp, the two or more second linkage assemblies are configured to remain angled relative to each other such that the first ends and the second ends of the two or more second linkage assemblies define an approximately trapezoidal arrangement.

Another embodiment of the present disclosure relates to a support system for an aftercooler pipe of an industrial vehicle. The system includes a first support assembly configured to couple a first portion of the aftercooler pipe to a platform of the vehicle. The first support assembly includes a first bracket configured to couple to the platform, a first clamp configured to couple to the first portion of the aftercooler pipe, and two or more first linkage assemblies coupled to the first bracket on a first end and to the first clamp on a second end, wherein the two or more first linkage assemblies are adjustable to allow movement of the first clamp relative to the first bracket in more than one plane, and wherein the two or more first linkage assemblies are configured to remain approximately parallel to each other when coupled to the first bracket and the first clamp. The system also includes a second support assembly configured to couple a second portion of the aftercooler pipe to the platform. The second support assembly includes a second bracket configured to couple to the platform, a second clamp configured to couple to the second portion of the aftercooler pipe, and two or more second linkage assemblies coupled to the second bracket on a first end and to the second clamp on a second end. The two or more second linkage assemblies are adjustable to allow movement of the second clamp relative to the second bracket in more than one plane, and wherein, when coupled to the second bracket and the second clamp, the two or more second linkage assemblies are configured to remain angled relative to each other such that the first ends and the second ends of the two or more second linkage assemblies define an approximately trapezoidal arrangement. The first support assembly and the second support assembly are configured to define a substantially trapezoidal arrangement with the platform and the aftercooler pipe when coupled to the fixed component and the aftercooler pipe.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
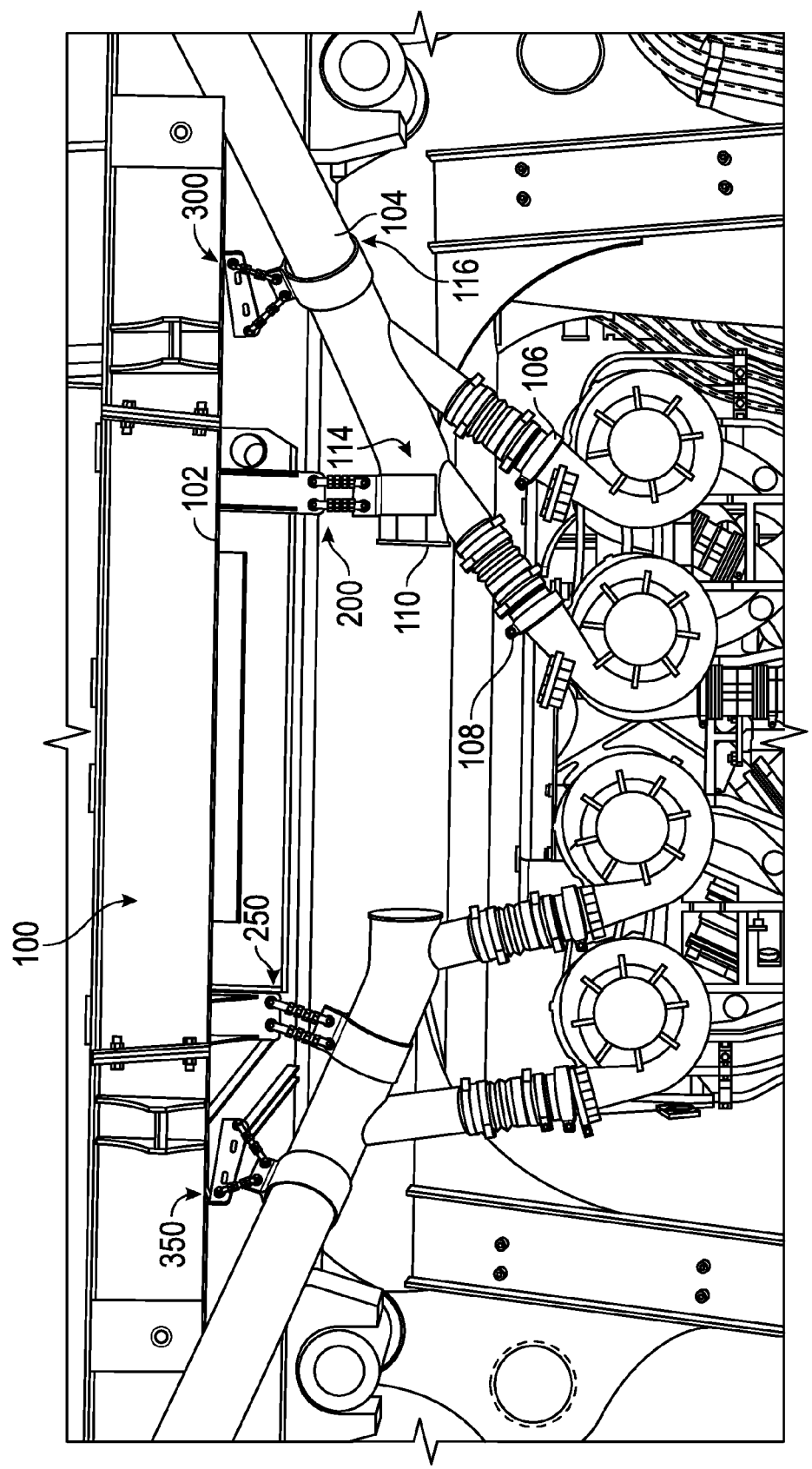
FIG. 1 is an illustration of a support system for an aftercooler pipe arrangement of an industrial vehicle, according to an exemplary embodiment.

Referring to FIG. 1, a support system 100 for supporting and maintaining the alignment of a pipe arrangement is shown, according to an exemplary embodiment. In this embodiment, the support system 100 is configured to support a pipe arrangement for an aftercooler, which may be used to transmit compressed air to turbo components of an engine assembly for a large industrial vehicle (e.g., a mining vehicle). However, in other embodiments the support system 100 may be utilized to support another type of pipe arrangement (e.g., pipes, tubes, etc.) having another function, such as those used to transmit fluids between components of industrial equipment.

In the illustrated embodiment, the aftercooler pipe arrangement includes an aftercooler pipe 104 having ports 106 and 108 each being configured to connect to a turbo housing. The pipe 104 is coupled to a fixed machine component (i.e., platform 102) in order to suspend (e.g., support, lift) the pipe 104 and maintain a desired position of the pipe 104, such as to align the ports 106 and 108 of the pipe 104 with one or more machine components (e.g., engine components, other vehicle components, etc.), as desired. Although the fixed component for suspending the pipe 104 is shown as the platform 102 in the illustrated embodiment, in other embodiments the fixed component may be a beam or another fixed (e.g., static, rigid, etc.) component near the engine assembly or otherwise associated with the vehicle and configured to limit a relative movement of the pipe 104. The ports 106 and 108 may be required to be fluidly connected to one or more components (e.g., the turbo assemblies) of an associated vehicle in order to provide one or more vehicle functions.

In an exemplary embodiment, the support system 100 includes a first support assembly 200 for coupling a first portion 114 of the pipe 104 to the platform 102, and a second support assembly 300 for coupling a second portion 116 of the pipe 104 to the platform 102. In other embodiments, however, the support system 100 may include a greater or lesser number of support assemblies and the support assemblies may be otherwise located in relation to the pipe 104 depending on the particular characteristics and requirements of the pipe 104 and/or the support system 100. In the illustrated embodiment, the support assembly 200 is coupled to the first portion 114 in an area of the first portion 114 that is positioned substantially parallel to the platform 102. Thus, the support assembly 200 is positioned substantially parallel to the first portion 114 of the pipe 104 and the platform 102 when the pipe 104 is at rest (as shown). The support assembly 300, on the other hand, is coupled to the second portion 116 in an area of the second portion 116 that is angled relative to the platform 102. Thus, the support assembly 300 includes components that are similar in function to the support assembly 200, but the components of the support assembly 300 are sized and shaped to fit the angled portion of the pipe 104. The support assemblies 200 and 300 are shown in further detail in FIG. 2 and described more particularly below.

Referring still to FIG. 1, the aftercooler pipe arrangement includes a second aftercooler pipe 112. As shown, the pipe 112 is similar to the pipe 104 in its features and function, forming substantially a mirror image of the pipe 104 and being configured to supply fluid to one or more turbo assemblies. All description herein that is related to pipe 104 may thus apply accordingly to the pipe 112. In the illustrated embodiment, the pipe 112 is suspended from the platform by support assemblies 250 and 350. The support assemblies 250 and 350 are similar to the support assemblies 200 and 300, respectively, other than minor differences which will be discussed below. Likewise, all description herein that is related to the support assemblies 200 and 300 may be applied accordingly to the support assemblies 250 and 350, respectively.

Figure 2:
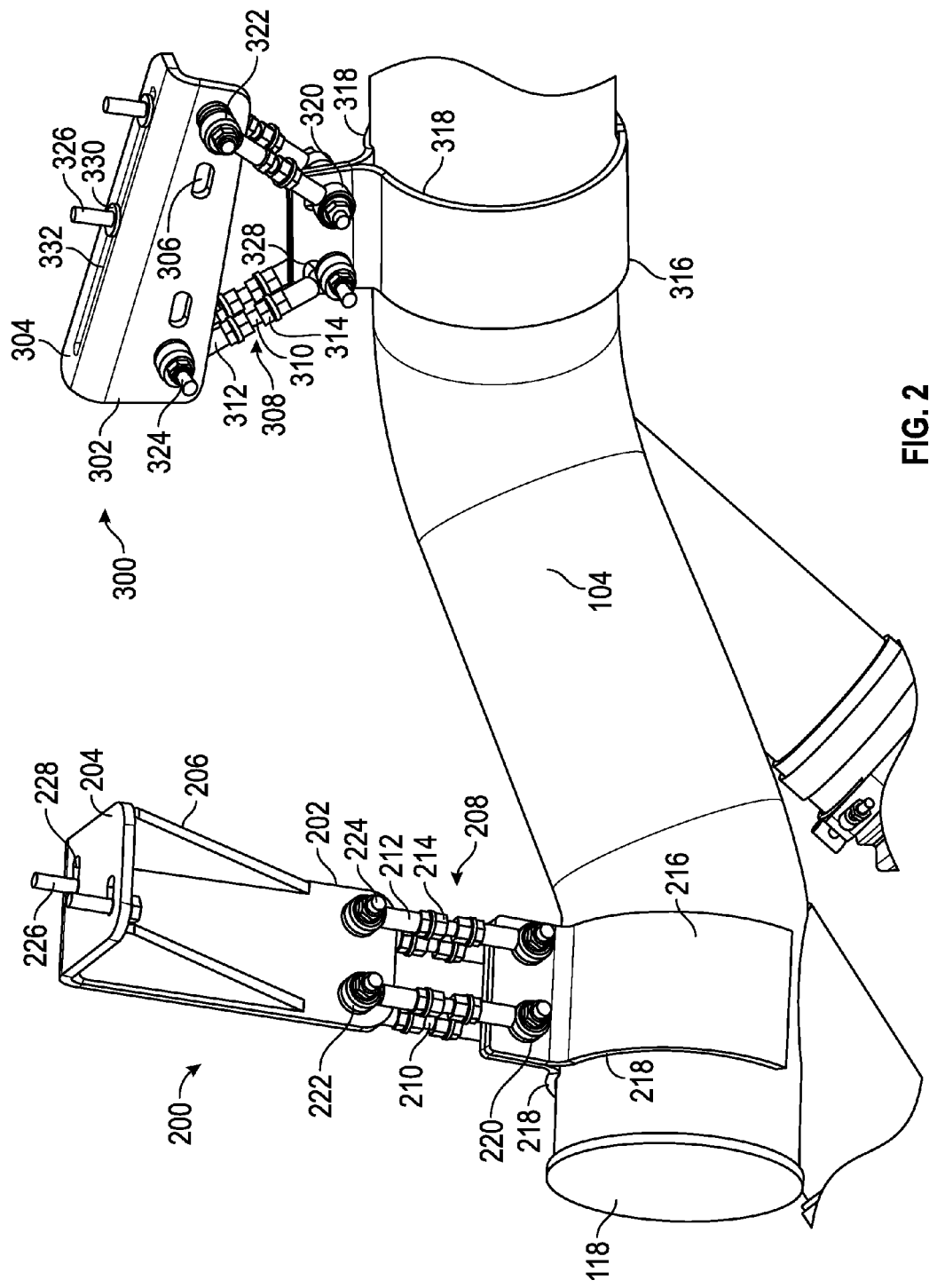
FIG. 2 is a front perspective view of an adjustable aftercooler pipe support assembly, according to an exemplary embodiment.

Referring now to FIG. 2, the aftercooler pipe 104 is shown coupled to the support assemblies 200 and 300, according to an exemplary embodiment. In this embodiment, the first support assembly 200 includes a first bracket 202 configured to couple to the platform 102 (or another fixed component). The bracket 202 may be coupled to the platform 102 by fasteners 226 (e.g., bolts, screws, etc.). For instance, the platform 102 may include a threaded opening configured to receive and secure the fasteners 226 to the platform 102. In the illustrated embodiment, the bracket 202 includes slots 228 that are oversized (e.g., wider than the diameter of the fasteners 226) to allow clearance for the fasteners 226 in at least one direction. The clearance of the slots 228 may enable the bracket 202 and/or the coupled aftercooler pipe 104 to be properly aligned. For instance, each component within the system 100 (e.g., the bracket 202, the pipe 104, etc.) may be within an acceptable tolerance for the given component. However, once a number of components are coupled together the tolerances may be "stacked," or added together, such that the bracket 202 and/or the pipe 104 may be misaligned. In this instance, the oversized slots 228 provide an amount of clearance in one direction (e.g., to the left or right according to FIG. 2), so that the components of the system 100 may be properly aligned. As an example, the fasteners 226 may be moved within the slots 228 in order to connect to threads or a slot of the platform 102.

The bracket 202 also includes a mating face 204 configured to contact the platform 102. In an exemplary embodiment, the mating face 204 is configured to correspond with (e.g., match) a face of the platform 102 such that the face 204 is flush with a face of the platform 102 when the bracket 202 is coupled to the platform 102. The bracket 202 may also include one or more braces 206 configured to provide additional support or durability for the bracket 202. The braces 206 may be positioned substantially perpendicular to the mating face 204 and connected to both the mating face 204 and a back face of the bracket 202 (according to FIG. 2) in order to prevent the bracket 202 from bending or otherwise deforming in response to stress applied via the aftercooler pipe 104 or as a result of the operation of another related machine component. The bracket 202 may be made from hardened steel or another durable material configured to limit deformation resulting from applied stress.

The support assembly 200 also includes a clamp 216 configured to couple to the first portion 114 of the pipe 104. The clamp 216 is configured to at least partially fit around the outer circumference of the pipe 104 in order to "grip" or otherwise couple the pipe 104 to the support assembly 200 and/or the platform 102. In this embodiment, the clamp 216 includes two separate clamp halves 218 that are configured to fit on each side of the pipe 104 so that the clamp 216 may be fitted over the pipe 104 without fitting over an end 118 of the pipe 104. For instance, the clamp halves 218 may be installed to the pipe 104 to form the clamp 216 and support the pipe 104 even when the pipe 104 is operably installed within the associated vehicle or machine (e.g., each of the ports 106 and 108 are connected to a turbo assembly or another component). The clamp halves 218 may be symmetrical and configured to fit over an identical portion of the pipe 104, or one of the clamp halves 218 may fit over a greater surface area of the pipe 104 than the other. In the illustrated embodiment, the clamp 216 does not extend around the entire circumference of the pipe 104 in order to accommodate the port 108, which extends from the bottom of the pipe 104. The clamp halves 218 that are shown in FIG. 2 may also increase the ease of assembly between the support assembly 200 and the pipe 104 when the pipe 104 is installed and in position. However, in other embodiments the two halves 218 may meet and contact each other at the bottom of the pipe 104 (as shown in clamp 316) to cover the entire circumference of the pipe 104. Like the bracket 202, the clamp 216 may be made from a durable material such as hardened steel in order to resist deformation due to applied stress from the system 100.

The clamp 216 is coupled to the bracket 202 by a linkage assembly 208 (e.g., linkage, tie rod, adjustable rod, etc.). Each linkage assembly 208 extends from the bracket 202 to the clamp 216 and is configured to allow a minimal amount of movement between the components of the system 100. In the illustrated embodiment, the support assembly 200 includes two (2) linkage assemblies 208 positioned on each side of the bracket 202 and the clamp 216 (i.e., a total of four (4) linkage assemblies 208) in order to provide the required support to receive any force or stress applied by the system 100 in this particular configuration. In other embodiments, however, the bracket 202 and the clamp 216 may be coupled by a greater or lesser amount of linkage assemblies 208, depending on the particular requirements of the support system 100 (e.g., the stress or force applied at the linkage assemblies 208).

The linkage assembly 208 includes connector 220 at a first end and connector 222 at a second end. In the illustrated embodiment, the connectors 220 and 222 are utilized to couple the linkage assembly 208 to the clamp 216 and the bracket 202, respectively. In one embodiment, the linkage assembly 208 is substantially symmetrical, such that the connectors 220 and 222 are substantially identical. In this embodiment, the linkage assembly 208 may be reversed (e.g., rotated 180 degrees) such that the connector 220 is used to couple the linkage assembly 208 to the bracket 202 and the connector 222 is used to couple the linkage assembly 208 to the clamp 216. The connectors 220 and 222 include a slot or hole within which a fastener may be positioned to couple the linkage assembly 208 to the clamp 216 and/or bracket 202. In an exemplary embodiment, the linkage assembly 208 is coupled to the bracket 202 and the clamp 216 using locking assembly 224. The locking assembly 224 may include a fastener (e.g., bolt, screw, etc.) which may be positioned within a slot or hole of one of the connectors 220, 222. The slots of the connectors 220, 222 may be configured (e.g., sized, shaped) to fit the fastener of the locking assembly 224. Likewise, the bracket 202 and the clamp halves 218 may include slots or holes that are configured to receive the fastener of the locking assembly 224. The locking assembly 224 may also include a nut or another locking device for fitting over the fastener to couple the linkage assembly 208 to the bracket 202 and/or the clamp 216. In one embodiment, the nut of the locking assembly 224 may be tightened to limit movement of the clamp 216, the linkage assemblies 208, the bracket 202, and/or the pipe 104 relative to each other.

In an exemplary embodiment, the linkage assembly 208 is adjustable to allow movement of the clamp 216 relative to the bracket 202 when the linkage assembly 208 is coupled to both the clamp 216 and the bracket 202 as part of the support assembly 200. In this way, the linkage assembly 208 (and thus the support assembly 200) is adjustable to allow movement of the pipe 104 relative to the platform 102 when the support assembly 200 is coupled to both the pipe 104 and the platform 102. For instance, the pipe 104 may need to be moved in more than one direction or plane (e.g., horizontally or vertically according to FIG. 2) in order to align one or more ports (e.g., ports 106, 108) of the pipe 104 with another machine component. The pipe 104 may then be adjusted or moved to connect to another component without removing any hardware or components of the support assemblies 200 or 300.

In an exemplary embodiment, the connectors 220 are configured to rotate relative to the clamp 216, and the connectors 222 are configured to rotate relative to the bracket 202, allowing the coupled pipe 104 to move to the left or the right relative to the substantially fixed bracket 202 and according to FIG. 2 (i.e., in a first plane). The connectors 220 and 222 are configured to rotate about an axis formed by the fastener of the associated locking assembly 224 (i.e., the fastener used to couple the respective connector 220 or 222 to either the clamp 216 or the bracket 202). The bracket 202, being coupled to a substantially fixed platform 102, is configured to remain fixed, while the adjustable linkage assemblies 208 allow the clamp 216 and the coupled pipe 104 to move relative to the bracket 202 and the platform 102.

In an exemplary embodiment, the linkage assemblies 208 are configured to move in concert, remaining substantially parallel to each other when coupled to the bracket 202 and the clamp 216 as the clamp 216 and/or the pipe 104 move in the first plane (e.g., horizontally). Referring again to FIG. 1, the support assembly 250 is substantially similar to the support assembly 200 and is representative of the configuration of the support assembly 200 if the clamp 216 of the support assembly 200 and the pipe 104 were moved to the left (according to FIG. 1). The linkage assemblies 208 of the support assembly 250 remain parallel to each other, with the top connectors (e.g., connectors 222) rotating clockwise relative to the bracket (e.g., bracket 202) to allow movement of the clamp (e.g., clamp 216) relative to the bracket. The connectors of the support assembly 250 define a parallelogram arrangement as the bottom connectors (e.g., connectors 220) are shifted to the left.

Further, the clamp of the support assembly 250 is coupled to an angled portion of the pipe 112 that is closer to the platform 102 than the first portion 114 of the pipe 104, yet the linkage assemblies are substantially the same length as those used for the support assembly 200. Therefore, a shorter bracket is used (i.e., from the platform 102 to the point of connection to the linkage assemblies) for coupling the support assembly 250 to the platform 102 in order to accommodate the components of the support assembly 250 in the smaller space. In other embodiments, the bracket (e.g., bracket 202) may be of another shape (e.g., as in support assemblies 300, 350) and may be any height or width as is suitable for the particular application of the support assembly and/or the pipe.

Referring again to FIG. 2, in an exemplary embodiment the connectors 220 and 222 include a spherical ball bearing that contacts the locking assembly 224 but rotates freely from the locking assembly 224 and the bracket 202, allowing the connector 220 or 222 to rotate relative to the locking assembly 224 (e.g., the fastener of the locking assembly 224). In this embodiment, the locking assemblies 224 couple the linkage assemblies 208 to the bracket 202 and the clamp 216, while allowing movement of the connectors 220 and 222 relative to the bracket 202 and the clamp 216. In one embodiment, movement of the connectors 220 and 222, and thus movement of the pipe 104 in the first plane, may be limited by tightening the locking assembly 224. Likewise, the support assembly 200 may be configured to allow more freedom of movement by loosening the locking assembly 224. In some embodiments, the locking assemblies 224 may be configured to move with the connectors 220 and 222 within the slots of the bracket 202 and/or the clamp 216. For instance, the slots of the bracket 202 and/or the clamp 216 may be oversized or include a ball bearing to allow relative movement (e.g., rotation, lateral movement, etc.) of the coupled locking assembly 224 and the linkage assembly 208. In at least one embodiment, the pipe 104 may also be configured to slide within the clamp 216 (left-right according to FIG. 2) in order to move substantially horizontally (i.e., in the first plane) relative to the bracket 202 and the platform 102, providing additional freedom of movement.

The linkage assembly 208 also includes a rod 210 that forms the base of the linkage assembly 208 and provides structure for the linkage assembly 208. The rod 210 may be a rigid member configured to support a force applied by the pipe 104 or another component of the support system 100. For instance, the pipe 104 may apply a compression or tension force to the rod 210, depending on the configuration of the pipe 104 and the support assembly 200. In one embodiment, half of the linkage assemblies 208 are configured to receive a tension force at the same time that the opposite half of the linkage assemblies 208 receive a compression force. The rod 210 is coupled to the connectors 220 and 222. For instance, the connectors 220 and 222 may include a sleeve 212 (e.g., housing) configured to fit over the rod 210 and couple the rod 210 to the remaining portion of the linkage assembly 208.

In an exemplary embodiment, the linkage assemblies 208 are adjustable to allow substantially vertical movement of the clamp 216 and the coupled pipe 104 relative to the bracket 202 and the fixed and coupled platform 102 (i.e., movement in a second plane or direction). For instance, the clamp 216 and the coupled pipe 104 may be configured to move axially with the linkage assemblies 208 (up or down relative to the bracket 202 and the platform 102 according to FIG. 2) by shortening or lengthening the linkage assemblies 208. In an exemplary embodiment, the linkage assemblies 208 may be shortened or lengthened via a coupled tightening assembly. In the illustrated embodiment, for instance, the rods 210 are threaded. In this embodiment, each of the linkage assemblies 208 include at least one threaded nut 214 (e.g., a tightening assembly) coupled to the rod 210 and configured to rotate relative to the rod 210 along the threads of the rod 210. Further, the nut 214 is coupled to the sleeve 212 or included as part of the connector 220 or 222 to form a tightening assembly for the linkage assembly 208. When the nut 214 is rotated (e.g., clockwise or counterclockwise), the rod 210 is either pulled into the sleeve 212 to shorten the linkage assembly 208 (and raise the pipe 104), or extended out from the sleeve 212 to lengthen the linkage assembly 208 (and lower the pipe 104). In this way, the clamp 216 may be moved in a second plane relative to the coupled bracket 202, and the pipe 104 may thus be moved in a second plane relative to the coupled platform 102. In one embodiment, for instance, the threaded nut 214 includes a right hand thread coupled to either of the connector 220 or 222 and the rod 210, and a left hand thread coupled to the other of the connector 220 or 222 and the rod 210.

The relative movement of the pipe 104 in more than one plane allows the ports 106 and 108 to be aligned with connecting components such as the turbo assemblies while remaining coupled to the platform 102. When the pipe 104 is installed within the support system 100 (e.g., coupled to the platform 102), certain components or hardware may be difficult to access. For instance, the area of the pipe 104 is typically crowded and may include little clearance due to other engine components. The adjustability of the linkage assemblies 208 and the support assembly 200 enables the pipe 104 to be adjusted as desired even with the limited access. Further, allowing minimal relative movement of the components of the support assembly 200 may prevent or limit the support assembly 200 from being bent or otherwise damaged due to the applied forces of the system 100, which may increase the life of the components.

Still referring to FIG. 2, a second support assembly 300 is also shown. The support assembly 300 is similar to the support assembly 200 and includes similar components. Therefore, any description herein related to the support assembly 200 applies accordingly to the support assembly 300. As described above, the support assembly 300 is configured to couple the second portion 116 of the pipe 104 to the platform 102. The second portion 116 is angled relative to the platform 102 in the illustrated embodiment, so the support assembly 300 may include one or more components configured to accommodate the angled pipe 104. For instance, the support assembly 300 includes a bracket 302 having an angled face 304 configured to mate with the platform 102. The bracket 302 includes an elongated slot 332 configured to received fasteners 326 to couple the bracket 302 to the platform 102. The fasteners 326 may be fitted within washers 330 when fastened to the platform 102.

The support assembly 300 also includes a plurality of linkage assemblies 308, which are similar to the linkage assemblies 208. The linkage assemblies 308 are coupled to the bracket 302 on a first end by locking assemblies 324. A fastener of the locking assembly 324 may be positioned through a slot of connector 322 and a slot of the bracket 302 (e.g., slot 306) and secured by a nut of the locking assembly 324. Each linkage assembly 308 includes a rod 310, a sleeve 312, and a tightening assembly such as nut 314 in order to shorten or lengthen the linkage assembly 308.

On a second end, the linkage assembly 308 is coupled to a clamp 316. The clamp 316 includes two clamp halves 318 configured to fit at least partially around a circumference of the pipe 104. The clamp 316 is coupled to the linkage assemblies 308 by locking assemblies 324. A fastener is positioned through a slot of a connector 320 on the second end of the linkage assembly 308 and also routed through slot 328 of the clamp 316. A nut is then positioned on the fastener to secure the linkage assembly 308 to the clamp 316.

In an exemplary embodiment, the linkage assembly 308 is adjustable to allow movement of the clamp 316 relative to the bracket 302 when the linkage assembly 308 is coupled to both the clamp 316 and the bracket 302 as part of the support assembly 300. In this way, the linkage assembly 308 (and thus the support assembly 300) is adjustable to allow movement of the pipe 104 relative to the platform 102 when the support assembly 300 is coupled to both the pipe 104 and the platform 102. For instance, the pipe 104 may need to be moved in more than one direction or plane (e.g., horizontally or vertically according to FIG. 2) in order to align one or more ports (e.g., ports 106, 108) of the pipe 104 with another machine component. The pipe 104 may then be adjusted or moved to connect to another component without removing any hardware or components of the support assemblies 200 or 300.

In an exemplary embodiment, the connectors 320 are configured to rotate relative to the clamp 316, and the connectors 322 are configured to rotate relative to the bracket 302, allowing the coupled pipe 104 to move to the left or the right relative to the substantially fixed bracket 302 and according to FIG. 2 (i.e., in a first plane). The connectors 320 and 322 are configured to rotate about an axis formed by the fastener of the associated locking assembly 324 (i.e., the fastener used to couple the respective connector 320 or 322 to either the clamp 316 or the bracket 302). The bracket 302, being coupled to a substantially fixed platform 102, is configured to remain fixed, while the adjustable linkage assemblies 308 allow the clamp 316 and the coupled pipe 104 to move relative to the bracket 302 and the platform 102.

In an exemplary embodiment, the linkage assemblies 308 define a trapezoidal arrangement when the linkage assemblies 308 are coupled to the bracket 302 on a first end and to the clamp 316 on a second end. The linkage assemblies 308 (e.g., the rods 310) may be subjected to a compression force and/or a tensile force based on the weight of the pipe 104. In an exemplary embodiment, approximately half of the linkage assemblies 308 (e.g., those positioned on a first side of the support assembly 300) are subjected to a compression force, and approximately half of the linkage assemblies 308 (e.g., those positioned on a second side of the support assembly 300) are subjected to a tensile force. When the clamp 316 and/or the pipe 104 are moved horizontally relative to the bracket 302 (e.g., to the left or right according to FIG. 2), the applied force at the linkage assemblies 308 may change. For instance, when the clamp 316 and/or the pipe 104 are moved to the left (according to FIG. 2), an additional compression force is applied to the linkage assemblies 308 on the left side of the support assembly 300 and an additional tensile force is applied to the linkage assemblies 308 on the right side of the support assembly 300 (according to FIG. 2). The linkage assemblies 308 may maintain an approximately trapezoidal arrangement when the clamp 316 and/or the pipe 104 are moved in the first plane (e.g., horizontally).

Similar to the linkage assemblies 208 of the support assembly, the linkage assemblies 308 are adjustable to allow approximately vertical movement of the clamp 316 and the coupled pipe 104 relative to the bracket 302 and the fixed and coupled platform 102 (i.e., movement in a second plane or direction). For instance, the clamp 316 and the coupled pipe 104 may be configured to move up or down relative to the bracket 302 and the platform 102 (according to FIG. 2) by shortening or lengthening the linkage assemblies 308 (e.g., via a tightening assembly). In one embodiment, a nut 314 (e.g., the tightening assembly) is coupled to the sleeve 312 or included as part of the connector 320 or 322 to form a tightening assembly for the linkage assembly 308. When the nut is rotated (e.g., clockwise or counterclockwise), the rod 310 may be either pulled into the sleeve 312 to shorten the linkage assembly 308 (and raise the pipe 104), or extended out from the sleeve 312 to lengthen the linkage assembly 308 (and lower the pipe 104). In this way, the clamp 316 may be moved in a second plane relative to the coupled bracket 302, and the pipe 104 may thus be moved in a second plane relative to the coupled platform 102.

In the illustrated configuration, shortening or lengthening the linkage assemblies 208 may move the pipe 104 (e.g., the ports 106, 108) further in the second plane than a similar shortening or lengthening of the linkage assemblies 308 because of the relative position of the linkage assemblies 208 and 308. The linkage assemblies 208 are positioned substantially perpendicular to both the pipe 104 and the platform 102, such that the pipe 104 is raised or lowered approximately the same distance that the linkage assemblies 208 are shortened or lengthened, respectively. However, the linkage assemblies 308 are positioned in a substantially trapezoidal arrangement and are angled relative to the platform 102 and the pipe 104. Thus, the pipe 104 may be raised or lowered a lesser relative distance than the linkage assemblies 308 are shortened or lengthened, respectively.

Referring again to FIG. 1, the support assembly 350 is substantially similar to the support assembly 300, including having similar components. All description of the support assembly 300 may apply accordingly to the support assembly 350. According to the system 100 of FIG. 1, the support assembly 350 is configured to support the pipe 112. In this embodiment, the support system 100 is approximately symmetrical such that the pipe 112 is angled in an opposite direction as the pipe 104. Likewise, the support assembly 350 is angled to match the angle of the pipe 112 relative to the platform 102. In one embodiment, the support assembly 350 is an approximately mirror image of the support assembly 300.

In other embodiments, the support assemblies 200, 250, 300, and 350 may be otherwise shaped to accommodate a configuration (e.g., shape, size, clearance, etc.) of the associated pipe arrangement. For instance, the brackets of the support assemblies may be configured to match a relative position of the pipe arrangement to the platform 102. Likewise, the configuration (e.g., arrangement) of the linkage assemblies for each support assembly may be modified according to the particular requirements of the pipe arrangement (and the support system 100), including the size and shape of the pipe 104, the load requirements of the support assemblies, the clearance between components within the system 100, the number of connectable ports on the pipe arrangement, the fluid being transported, the relative distance to a fixed component (e.g., the platform 102), or any other conditions present within the system 100.

Figure 3:
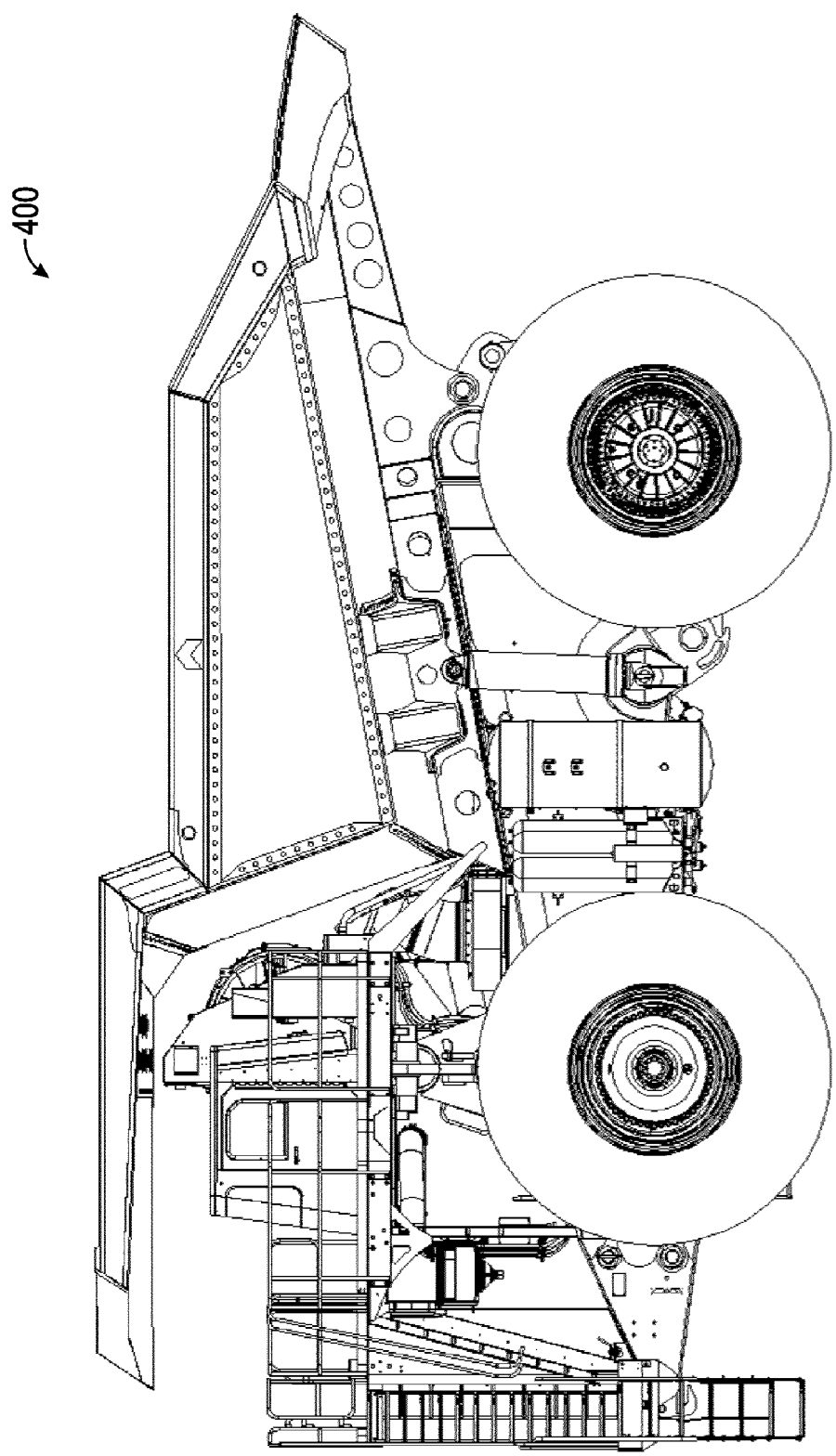
FIG. 3 is a perspective view of an industrial vehicle having an aftercooler pipe support assembly of the present disclosure, according to an exemplary embodiment.

Referring now to FIG. 3, a large industrial vehicle 400 is shown, according to an exemplary embodiment. The support system 100 of the present disclosure may be utilized within the vehicle 400 in order to support and maintain alignment of a pipe arrangement within the vehicle 400. In an exemplary embodiment, the support system 100 may be used to support and maintain alignment of an aftercooler arrangement or assembly as part of an engine assembly.

The construction and arrangement of the aftercooler pipe support assembly, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

INDUSTRIAL APPLICABILITY

The disclosed aftercooler pipe support assembly may be implemented to support a pipe arrangement (e.g., one or more fluid pipes or tubes) for transporting fluid within large industrial equipment. The disclosed aftercooler pipe support assembly is intended to absorb a force applied by the pipe arrangement and any associated components in order to reduce wear or damage to the pipe arrangement and associated components. The disclosed aftercooler pipe support assembly is also intended to maintain alignment of the pipe arrangement such that the pipe arrangement is able to fluidly connect to any associated components. The support assembly may include linkage assemblies which are adjustable in more than one plane or direction such that a pipe or port of the pipe arrangement may be functionally coupled to another component of the industrial equipment.

It will be apparent to those skilled in the art that various modifications and variations can be made to the disclosed aftercooler pipe support assembly. Other embodiments will be apparent to those skilled in the art from consideration of the specification and practice of the disclosed aftercooler pipe support assembly. It is intended that the specification and examples be considered as exemplary only, with a true scope being indicated by the following claims and their equivalents.

What is claimed is:

1. A support system for a fluid pipe of an industrial vehicle, the system comprising:
   a first support assembly configured to couple a first portion of the fluid pipe to a fixed component of the vehicle, the first support assembly comprising:
      a first bracket configured to couple to the fixed component;
      a first clamp configured to couple to the first portion of the fluid pipe; and
      two or more first linkage assemblies coupled to the first bracket on a first end and to the first clamp on a second end, wherein the two or more first linkage assemblies are adjustable to allow movement of the first clamp relative to the first bracket in more than one plane, and wherein the two or more first linkage assemblies are configured to remain approximately parallel to each other when coupled to the first bracket and the first clamp; and
   a second support assembly configured to couple a second portion of the fluid pipe to the fixed component, the second support assembly comprising:
      a second bracket configured to couple to the fixed component;
      a second clamp configured to couple to the second portion of the fluid pipe; and
      two or more second linkage assemblies coupled to the second bracket on a first end and to the second clamp on a second end, wherein the two or more second linkage assemblies are adjustable to allow movement of the second clamp relative to the second bracket in more than one plane, and wherein, when coupled to the second bracket and the second clamp, the two or more second linkage assemblies are configured to remain angled relative to each other such that the first ends and the second ends of the two or more second linkage assemblies define an approximately trapezoidal arrangement.

2. The system of claim 1, wherein the first support assembly and the second support assembly are configured to define a substantially trapezoidal arrangement with the fixed component and the fluid pipe when coupled to the fixed component and the fluid pipe.

3. The system of claim 1, wherein each of the linkage assemblies includes:
   a rod configured to receive at least one of a compressive and a tensile force via the fluid pipe;
   a first connector coupled to the rod at a first end and coupled to an associated bracket at a second end by a first locking assembly;
   a second connector coupled to the rod at a first end and coupled to an associated clamp at a second end by a second locking assembly, wherein the first connector is configured to rotate relative to the associated bracket about the first locking assembly and the second connector is configured to rotate relative to the associated clamp about the second locking assembly to allow movement of the associated clamp relative to the associated bracket in a first plane of motion; and
   a tightening assembly coupled to the rod and to at least one of the connectors, the tightening assembly being adjustable to move the associated clamp relative to the associated bracket in a second plane of motion by shortening or lengthening the linkage assembly.

4. The system of claim 3, wherein the tightening assembly includes a threaded nut positioned at an end of at least one of the connectors and configured to rotate to adjust the length of the linkage assembly, wherein the threaded nut includes a right hand thread coupled to one of: (i) the at least one of the connectors and (ii) the rod, and a left hand thread coupled to the other of: (i) the at least one of the connectors and (ii) the rod.

5. The system of claim 3, wherein the relative movement of the first and second connectors may be limited by adjusting their respective locking assemblies.

6. A support system for an aftercooler pipe of an industrial vehicle, the system comprising:
   a first support assembly configured to couple a first portion of the aftercooler pipe to a platform of the vehicle, the first support assembly comprising:
      a first bracket configured to couple to the platform;
      a first clamp configured to couple to the first portion of the aftercooler pipe; and
      two or more first linkage assemblies coupled to the first bracket on a first end and to the first clamp on a second end, wherein the two or more first linkage assemblies are adjustable to allow movement of the first clamp relative to the first bracket in more than one plane, and wherein the two or more first linkage assemblies are configured to remain approximately parallel to each other when coupled to the first bracket and the first clamp; and a second support assembly configured to couple a second portion of the aftercooler pipe to the platform, the second support assembly comprising:

a second bracket configured to couple to the platform;

a second clamp configured to couple to the second portion of the aftercooler pipe; and two or more second linkage assemblies coupled to the second bracket on a first end and to the second clamp on a second end, wherein the two or more second linkage assemblies are adjustable to allow movement of the second clamp relative to the second bracket in more than one plane, and wherein, when coupled to the second bracket and the second clamp, the two or more second linkage assemblies are configured to remain angled relative to each other such that the first ends and the second ends of the two or more second linkage assemblies define an approximately trapezoidal arrangement;

wherein the first support assembly and the second support assembly are configured to define a substantially trapezoidal arrangement with the platform and the aftercooler pipe when coupled to the platform and the aftercooler pipe.

7. The system of claim 6, wherein each of the linkage assemblies includes:

a rod configured to receive at least one of a compressive and a tensile force via the aftercooler pipe;

a first connector coupled to the rod at a first end and coupled to an associated bracket at a second end by a first locking assembly;

a second connector coupled to the rod at a first end and coupled to an associated clamp at a second end by a second locking assembly, wherein the first connector is configured to rotate relative to the associated bracket about the first locking assembly and the second connector is configured to rotate relative to the associated clamp about the second locking assembly to allow movement of the associated clamp relative to the associated bracket in a first plane of motion; and a tightening assembly coupled to the rod and to at least one of the connectors, the tightening assembly being adjustable to move the associated clamp relative to the associated bracket in a second plane of motion by shortening or lengthening the linkage assembly.

8. The system of claim 7, wherein the tightening assembly includes a threaded nut positioned at an end of at least one of the connectors and configured to rotate to adjust the length of the linkage assembly, wherein the threaded nut includes a right hand thread coupled to one of: (i) the at least one of the connectors and (ii) the rod, and a left hand thread coupled to the other of: (i) the at least one of the connectors and (ii) the rod.

9. The system of claim 7, wherein a relative movement of the first and second connectors may be limited by adjusting their respective locking assemblies.

* * * * *